US012073744B2

(12) United States Patent
Woo et al.

(10) Patent No.: US 12,073,744 B2
(45) Date of Patent: Aug. 27, 2024

(54) ROTATABLE DISPLAY DEVICE USING SEMICONDUCTOR LIGHT-EMITTING DIODES

(71) Applicant: LG ELECTRONICS INC., Seoul (KR)

(72) Inventors: Kisuk Woo, Seoul (KR); Sungwhan Lee, Seoul (KR); Kwanwoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 224 days.

(21) Appl. No.: 17/763,873

(22) PCT Filed: Oct. 1, 2019

(86) PCT No.: PCT/KR2019/012805
§ 371 (c)(1),
(2) Date: Mar. 25, 2022

(87) PCT Pub. No.: WO2021/060594
PCT Pub. Date: Apr. 1, 2021

(65) Prior Publication Data

US 2022/0343812 A1 Oct. 27, 2022

(30) Foreign Application Priority Data

Sep. 26, 2019 (KR) ........................ 10-2019-0118711

(51) Int. Cl.
*G09F 11/02* (2006.01)
*G09F 9/33* (2006.01)

(52) U.S. Cl.
CPC .............. *G09F 11/025* (2013.01); *G09F 9/33* (2013.01)

(58) Field of Classification Search
CPC .................................................... G09F 11/025
See application file for complete search history.

(56) References Cited

U.S. PATENT DOCUMENTS 5,003,444 A 3/1991 Secka et al.
2003/0058201 A1 3/2003 Wang
(Continued)

FOREIGN PATENT DOCUMENTS

CN 108962112 12/2018
CN 108962112 A * 12/2018 ............ G09F 9/377
(Continued)

OTHER PUBLICATIONS

English translation of Jeon KR-20180061518-A, published Jun. 2018 (Year: 2018).*
English translation of Zhang CN 108962112, published Dec. 2018 (Year: 2018).*
(Continued)

*Primary Examiner* — Evan P Dzierzynski
(74) *Attorney, Agent, or Firm* — LEE, HONG, DEGERMAN, KANG & WAIMEY

(57) ABSTRACT

The present disclosure can be applied to display device-related technical fields and relates to a rotatable display device using, for example, light-emitting diodes (LEDs), which are semiconductor light-emitting diodes. According to the present disclosure, the rotatable display device using light-emitting diodes may comprise: a fixing unit comprising a motor; a rotation unit which is provided on the fixing unit and has a first side coupled to the motor and a second side rotatably coupled to a rotation coupling part, and rotates, the second side being a side opposite to the first side; and a light source module provided in the rotation unit and comprising at least one panel provided along a virtual cylindrical outer circumferential surface thereof and a light-emitting diode array in which individual pixels are provided on each panel in the longitudinal direction.

10 Claims, 11 Drawing Sheets

(56) References Cited

U.S. PATENT DOCUMENTS

| | | | | |
|---|---|---|---|---|
| 2005/0040121 | A1* | 2/2005 | Aros | A47F 5/02 211/163 |
| 2005/0050778 | A1* | 3/2005 | Kim | G09F 9/33 40/431 |
| 2008/0094323 | A1* | 4/2008 | Sirmon | G09G 3/005 348/E9.026 |
| 2008/0225235 | A1* | 9/2008 | Wang | G02B 26/105 359/226.1 |
| 2009/0032478 | A1* | 2/2009 | Johnson | A47F 7/02 348/739 |
| 2009/0189049 | A1* | 7/2009 | Chang | F16M 11/18 248/425 |
| 2010/0171681 | A1 | 7/2010 | Cabanas et al. | |

FOREIGN PATENT DOCUMENTS

| | | | | |
|---|---|---|---|---|
| CN | 208368055 | | | 1/2019 |
| JP | 2000276083 | | | 10/2000 |
| KR | 20-0355482 | | | 7/2004 |
| KR | 10-2007-0053226 | | | 5/2007 |
| KR | 10-2014-0013721 | | | 2/2014 |
| KR | 20180061518 | A | * | 6/2018 |
| WO | 2006021788 | | | 3/2006 |

OTHER PUBLICATIONS

European Patent Office Application Serial No. 19946838.0, Search Report dated Sep. 26, 2023, 9 pages.

PCT International Application No. PCT/KR2019/012805, International Search Report dated Jun. 24, 2020, 10 pages.

* cited by examiner

ROTATABLE DISPLAY DEVICE USING SEMICONDUCTOR LIGHT-EMITTING DIODES

CROSS-REFERENCE TO RELATED APPLICATIONS

This application is the National Stage filing under 35 U.S.C. 371 of International Application No. PCT/KR2019/012805, filed on Oct. 1, 2019, which claims the benefit of earlier filing date and right of priority to Korean Application No. 10-2019-0118711, filed on Sep. 26, 2019, the contents of which are all hereby incorporated by reference herein their entirety.

TECHNICAL FIELD

The present disclosure is applicable to display-device-related technical fields, and relates to a rotatable display device using a light-emitting diode (LED), which is a semiconductor light-emitting element.

BACKGROUND ART

Recently, in the field of display technology, display devices having excellent characteristics, such as thinness and flexibility, have been developed. Meanwhile, currently commercialized major displays are represented by a liquid crystal display (LCD) and an organic light-emitting diode (OLED).

However, the LCD has problems in which the response time is slow and it is difficult to realize flexibility, and the OLED has problems in which the lifespan thereof is short and the production yield thereof is low.

Meanwhile, a light-emitting diode (LED), which is a well-known semiconductor light-emitting element that converts current into light, has been used as a light source for displaying an image in electronic devices including information communication devices together with a GaP:N-based green LED, starting with commercialization of a red LED using a GaAsP compound semiconductor in 1962. Therefore, a method of solving the above-described problems by implementing a display using the semiconductor light-emitting element may be proposed. Such a light-emitting diode has various advantages, such as a long lifespan, low power consumption, excellent initial driving characteristics, and high vibration resistance, compared to a filament-based light-emitting element.

Meanwhile, when a light-emitting module in which light-emitting elements are arranged in one dimension is rotated and driven at a high speed according to the angle thereof, various letters, graphics, and videos may be recognized by a human due to an afterimage effect.

In general, when still images are continuously displayed at a rate of 24 or more sheets per second, a viewer recognizes the same as a video. A conventional image display device, such as a CRT, an LCD, or a PDP, displays still images at a rate of 30 to 60 frames per second, so a viewer is capable of recognizing the same as a video. As the number of still images displayed per second increases, a viewer may experience smoother video, and as the number of still images displayed per second decreases, it becomes difficult to implement smooth video.

A general rotatable display device is structured such that a lower side of a light source module is connected to a driving shaft of a motor so as to be rotated thereby. Because the light source module is supported by a single shaft, vibration occurs due to the insufficient stiffness of a rotary shaft during rotation thereof at high speed, leading to screen shaking.

A rotatable display device is applicable to end products including image display devices, such as artificial intelligence speakers and small display apparatuses. In the case of a general product having a single-shaft support structure, when the product is dropped or when an external impact is applied thereto, the shaft may be deformed, or the product may be damaged due to the insufficient stiffness of the shaft.

Meanwhile, a rotatable display device using an afterimage displays one image sheet for each rotation thereof. When the rotational speed thereof is low, screen flickering occurs. For example, when it is necessary to output a 60 Hz image, a rotatable display device provided with a single light source module (panel) needs to be rotated at 3600 rpm.

In order to reduce the number of rotations per minute, the number of light source modules (panels) may be increased. However, increasing the number of light source modules decreases transparency (see-through) and increases costs. Therefore, it is necessary to select an appropriate number of light source modules and an appropriate rotational speed thereof.

In the case of a motor-powered rotatable device, the operational speed thereof is selected so as to avoid a critical speed in order to reduce vibration and noise and to increase the lifespan of the device. In general, the operational speed is designed to be outside of a range of the critical speed ±25%.

Here, the critical speed may be measured on the basis of a natural frequency of a system, or may be calculated based on a simulation such as finite element analysis. In a rotary body, a natural frequency is an eigenvalue determined by the moment of inertia and the stiffness of a structure.

As a result of analyzing vibration simulation for a rotatable display device that is composed of a light source module including two panels and has a single-shaft support structure (that is, a structure in which only a driving shaft of a motor is connected to a rotary portion), it can be seen that a primary natural frequency is 30 Hz, and at this time, the rotatable display device performs rotating movement in a tilted state.

That is, when the rotational speed is about 1800 rpm, the light source module is rotated in a tilted state by exciting force, such as eccentricity. This rotational speed is similar to the rotational speed of an actual rotatable display.

At this time, vibration, noise, and image shaking may occur, which may significantly degrade the quality of the product.

Therefore, there is a need for a method of eliminating vibration and noise phenomena.

DISCLOSURE

Technical Task

A technical task of the present disclosure is to provide a rotatable display device using a semiconductor light-emitting element, which is capable of reducing the occurrence of vibration and noise of the rotatable display device.

In addition, the present disclosure provides a rotatable display device using a semiconductor light-emitting element, which is capable of setting a frequency corresponding to the rotational speed of a display to be very different from a rotational natural frequency.

In addition, the present disclosure provides a rotatable display device using a semiconductor light-emitting element, which enables a rotary portion to rotate at an appropriate speed by stably supporting the rotation of the rotary portion without a change, for example, without using a lightweight and high-stiffness material.

Technical Solutions

In accordance with a first aspect for accomplishing the above objects, a rotatable display device using a light-emitting element of the present disclosure may include a fixed portion including a motor, a rotary portion located on the fixed portion and including a first side coupled to the motor and a second side rotatably coupled to a rotation coupling portion so as to be rotated, the second side being opposite the first side, and a light source module mounted to the rotary portion and including one or more panels disposed at respective positions on a rotational circumference of the rotary unit, and light-emitting element arrays including individual pixels disposed along a longitudinal length of the one or more panels.

In addition, a casing which encases the fixed portion, the rotary portion, and the light source module, may be further included.

In addition, the rotation coupling portion may be connected to the casing.

In addition, the casing may include an opaque portion positioned to correspond to the fixed portion, a transparent portion positioned to correspond to the light source module, and a cover portion located on the transparent portion.

In addition, the rotation coupling portion may be positioned to correspond to the center of the cover portion.

In addition, the rotation coupling portion may include a rotary shaft inserted into the second side of the rotary portion.

In addition, the second side of the rotary portion may include a shaft-coupling portion into which the rotary shaft is inserted.

In addition, a shaft support portion may be located between the rotary shaft and the shaft-coupling portion so as to facilitate coupling and rotation between the rotary shaft and the shaft-coupling portion.

In addition, the longitudinal length of the one or more panels of the light source module may extend between the first side and the second side of the rotary portion.

In addition, the rotation coupling portion may be connected to the fixed portion.

In addition, the rotation coupling portion may be coupled to a vertical frame connected to the fixed portion.

In addition, the fixed portion may include a frame structure, and the vertical frame may be coupled to the frame structure.

In accordance with a second aspect for accomplishing the above objects, a rotatable display device using a light-emitting element of the present disclosure may include a fixed portion including a motor, a rotary portion located on the fixed portion and including a first side fixedly coupled to the motor and a second side provided with a shaft-coupling portion so as to be rotated by operation of the motor, the second side being opposite the first side, a light source module mounted to the rotary portion and including one or more panels disposed along an imaginary cylindrical outer circumferential surface and light-emitting element arrays including individual pixels disposed on the panels in a longitudinal direction of the panels, and a rotation coupling portion coupled to the shaft-coupling portion to support rotational movement of the rotary portion.

Advantageous Effects

According to an embodiment of the present disclosure, there are the following effects.

First, according to the present disclosure, it can be confirmed that, when the configuration of the rotatable display device is changed from a single-shaft support structure to a double-ended support structure of the present disclosure, a natural frequency can be increased twofold or greater, i.e. to 60 Hz or greater.

Accordingly, since the primary natural frequency is distant from the rotational frequency band of the rotatable display device, vibration and noise may be greatly reduced.

Therefore, it may be possible to enable the rotary portion to rotate at an appropriate speed by stably supporting the rotation of the rotary portion without a change, for example, without using a lightweight and high-stiffness material, thereby preventing the occurrence of vibration and noise of the light source module and an image shaking phenomenon.

Further, according to the present disclosure, there are additional technical effects not mentioned herein, and those skilled in the art can understand the effects through the specification and the drawings.

BEST MODE FOR DISCLOSURE

Reference will now be made in detail to embodiments of the present disclosure, examples of which are illustrated in the accompanying drawings. Wherever possible, the same reference numbers will be used throughout the drawings to refer to the same or like parts, and a redundant description thereof will be omitted. As used herein, the suffixes "module" and "unit" are added or used interchangeably to facilitate preparation of this specification, and are not intended to suggest distinct meanings or functions. In describing embodiments disclosed in this specification, relevant well-known technologies may not be described in detail in order to avoid obscuring the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining two or more drawings are also within the scope of the present disclosure.

In addition, when an element such as a layer, a region, or a substrate is described as being "on" another element, it is to be understood that the element may be directly on the other element, or there may be an intermediate element between them.

The display device described herein conceptually includes all display devices that display information with a unit pixel or a set of unit pixels. Therefore, the term "display device" may be applied not only to finished products but also to parts. For example, a panel corresponding to a part of a digital TV also independently corresponds to the display device in the present specification. Such finished products include a mobile phone, a smartphone, a laptop computer, a digital broadcasting terminal, a personal digital assistant (PDA), a portable multimedia player (PMP), a navigation system, a slate PC, a tablet PC, an Ultrabook, a digital TV, a desktop computer, and the like.

However, it will be readily apparent to those skilled in the art that the configuration according to the embodiments described herein is also applicable to new products to be developed later as display devices.

In addition, the term "semiconductor light-emitting element" mentioned in this specification conceptually includes an LED, a micro LED, and the like, and may be used interchangeably therewith.

Figure 1:
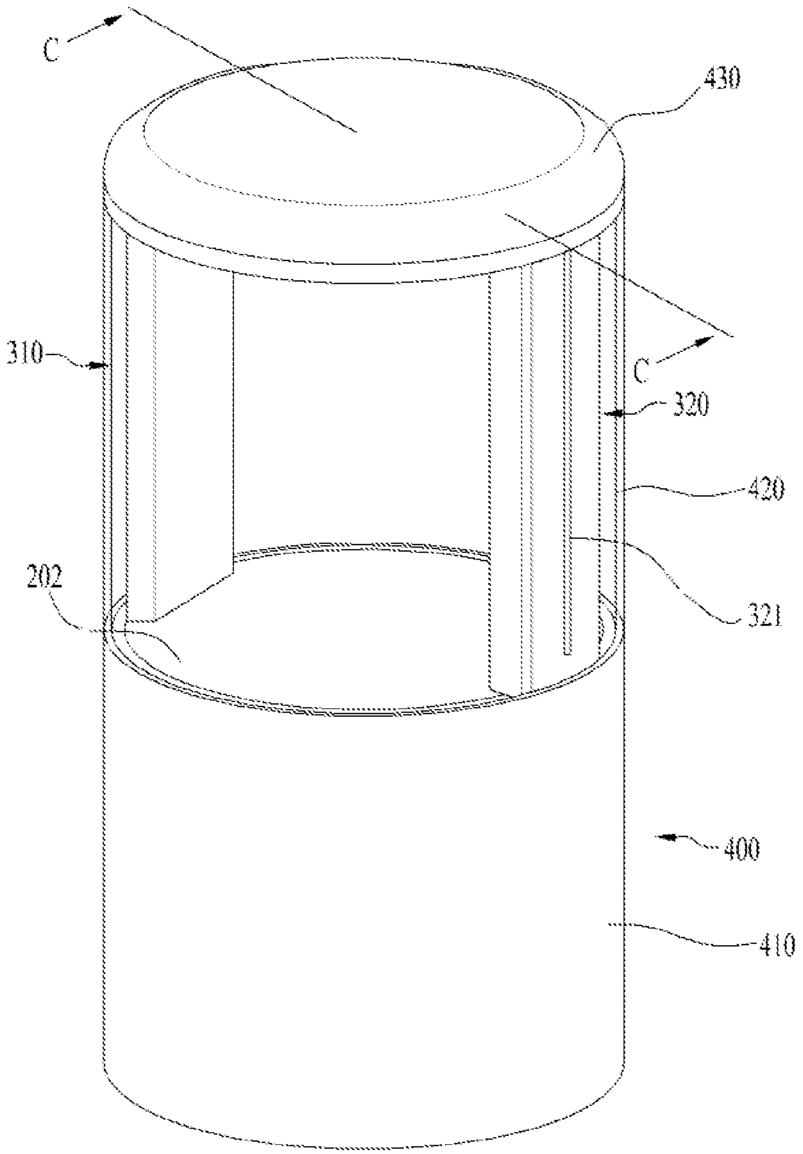
FIG. 1 is an external perspective view of a rotatable display device according to a first embodiment of the present disclosure.
Figure 2:
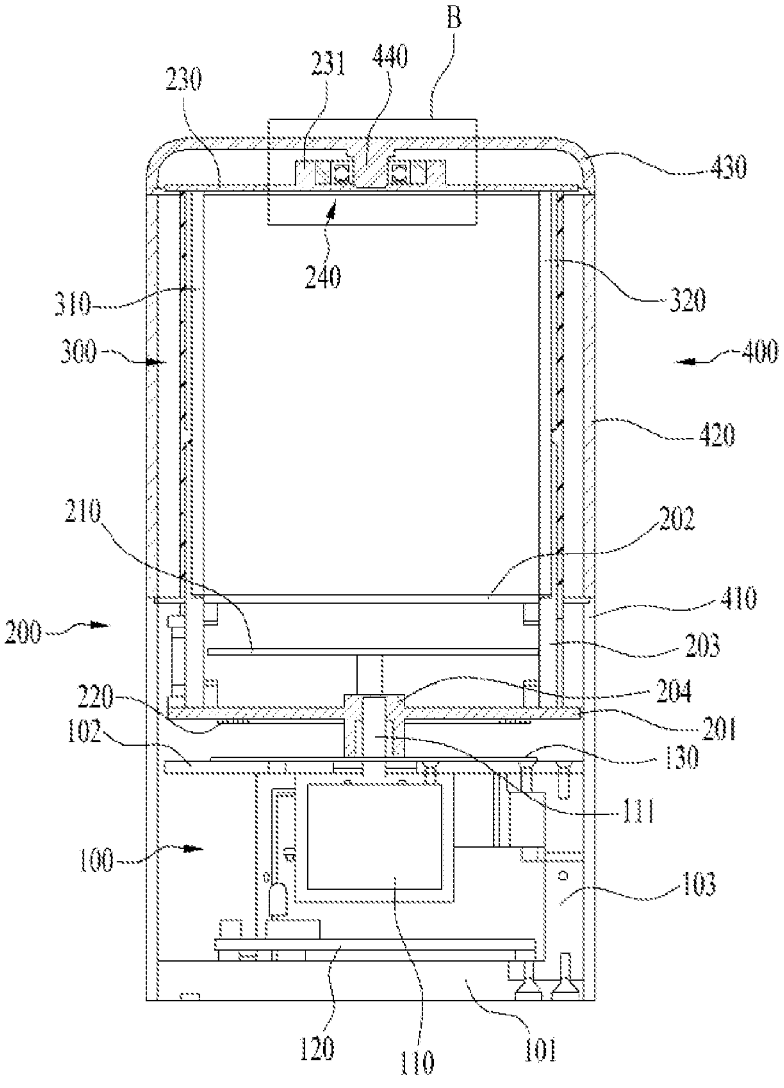
FIG. 2 is a cross-sectional view taken along line C-C in FIG. 1.

FIG. 1 is an external perspective view of a rotatable display device according to a first embodiment of the present disclosure. In addition, FIG. 2 is a cross-sectional view taken along line C-C in FIG. 1.

FIG. 1 illustrates a cylindrical-shaped rotatable display device in which light-emitting element arrays 311 and 321 (refer to FIG. 3) are respectively provided on one or more panels 310 and 320, which are disposed along an imaginary cylindrical outer circumferential surface, in the longitudinal direction of each of the panels.

Such a rotatable display device may broadly include a fixed portion 100, which includes a motor 110, a rotary portion 200, which is located on the fixed portion 100 and is rotated by the motor 110, and a light source module 300, which is coupled to the rotary portion 200 and includes the light-emitting element arrays 311 mounted on the panels 310 and 320 so as to implement a display by creating an afterimage resulting from rotation.

In this case, the light source module 300 may include the light-emitting element arrays 311 and 321, which are mounted on one or more bar-shaped panels 310 and 320, which are arranged at regular intervals on the outer circumferential surface of the cylinder, in the longitudinal direction of each of the panels.

Referring to FIGS. 1 and 2, the light source module 300 may include two panels 310 and 320, on which the light-emitting element arrays 311 and 321 are provided. However, this is given merely by way of example, and the light source module 300 may include one or more panels.

In the light-emitting element arrays 311, individual pixels may be disposed on the panels 310 and 320 in the longitudinal direction of each of the panels. A detailed description of the operation of the light-emitting element arrays 311 and 321 provided in the light source module 300 will be omitted.

Each of the panels 310 and 320 constituting the light source module 300 may be configured as a printed circuit board (PCB). That is, each of the panels 310 and 320 may have the function of a printed circuit board. Each of the light-emitting element arrays 311 and 321 may implement an individual unit pixel, and may be disposed on a corresponding one of the panels 310 and 320 in the longitudinal direction of the corresponding panel.

The panels provided with the light-emitting element arrays 311 and 321 may implement a display using an afterimage created by rotation thereof. Implementation of an afterimage display will be described later in brief.

As described above, the light source module 300 may be constituted by a plurality of panels 310 and 320. However, the light source module 300 may be constituted by a single panel provided with a light-emitting element array. When the light source module 300 is constituted by two panels 310 and 320, as illustrated in FIG. 1, the plurality of panels may realize one frame image in a shared manner, and may thus be rotated at a lower speed than when realizing a given frame image using a single panel.

Meanwhile, the fixed portion 100 may include frame structures 101, 102, and 103. That is, the fixed portion 100 may include a lower frame 101, an upper frame 102, and a connection frame 103, which connects the lower frame 101 and the upper frame 102 to each other.

These frame structures 101, 102, and 103 may provide a space in which to mount the motor 110, and may further provide a space in which to mount a power supply 120 and an RF module 126.

In addition, a weight (not shown) may be mounted to the fixed portion 100 in order to reduce the influence of high-speed rotation of the rotary portion 200.

Similarly, the rotary portion 200 may include frame structures 201, 202, and 203. That is, the rotary portion 200 may include a lower frame 201, an upper frame 202, and a connection frame 203, which connects the lower frame 201 and the upper frame 202 to each other.

These frame structures 201, 202, and 203 may provide a space in which a driving circuit 210 for driving the light-emitting element arrays 311 and 321 in order to implement a display is mounted.

In this case, a driving shaft 111 of the motor 110 may be coupled to a first side of the rotary portion 200. Here, the first side of the rotary portion 200 may be the lower frame 201, which is located at a lower side of the rotary portion 200. The following description will be made with reference to the case in which the lower side (the first side) of the rotary portion 200, which is coupled to the motor 110, is the lower frame 201. However, the present disclosure is not limited thereto.

More specifically, the driving shaft 111 of the motor 110 may be fixed to a shaft-fixing portion 204 formed at the lower frame 201. In this way, the driving shaft 111 of the motor 110 and the center of rotation of the rotary portion 200 may be coaxially located. Accordingly, the lower side of the rotary portion 200 may be coupled to the driving shaft 111 of the motor 110.

Referring to FIG. 2, a second side (that is, an upper side) of the rotary portion 200, which is opposite the first side thereof, may be rotatably coupled to a rotation coupling portion 440. That is, the rotary portion 200 is capable of rotating because the first side thereof is coupled to the motor 110 and the second side, which is opposite the first side, is rotatably coupled to the rotation coupling portion 440.

In this way, since both the upper side and the lower side of the rotary portion 200 are supported, the rotary portion 200 may stably rotate without positional deviation of the center of rotation thereof. This will be described later in detail.

The light source module 300 may be fixedly mounted to an upper side of the upper frame 202 of the rotary portion 200.

A cover frame 230, which corresponds to the second side of the rotary portion 200, may be located on the panels 310 and 320 constituting the light source module 300.

Figure 3:
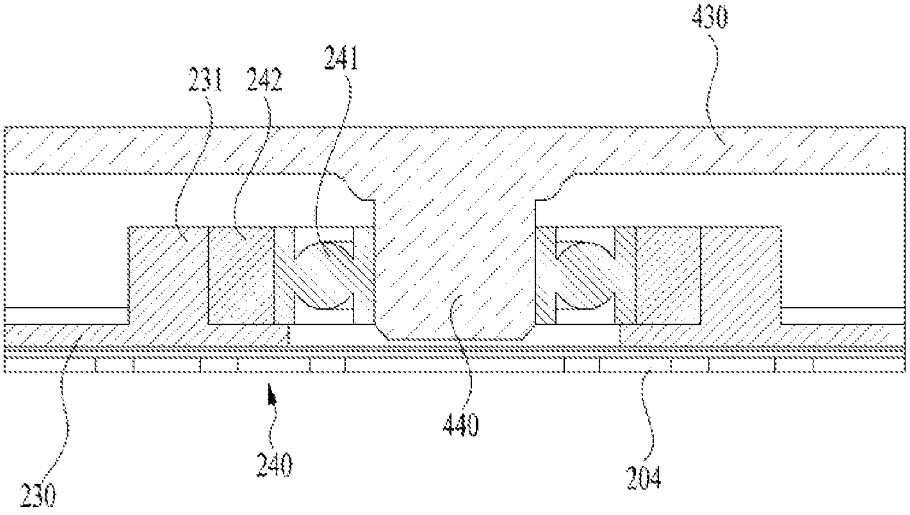
FIG. 3 is an enlarged view showing an example of portion B in FIG. 2.

FIG. 3 is an enlarged view showing an example of portion B in FIG. 2. Referring to FIGS. 2 and 3, the cover frame 230 may be provided with a shaft-coupling portion 231, which has an insertion hole formed therein to allow the rotation coupling portion 440 to be fitted thereinto.

In this case, the rotation coupling portion 440 may include a rotary shaft 440, which is inserted into the second side of the rotary portion 200, i.e. the shaft-coupling portion 231. That is, the rotation coupling portion 440 may be formed in the shape of a rotary shaft.

Alternatively, the rotation coupling portion 440 may be formed in the shape of an insertion hole, and the second side of the rotary portion 200 may be formed in the shape of a shaft so as to be inserted into the insertion hole. That is, the rotation coupling portion 440 may be formed in the shape of a rotary shaft, or may be formed in the shape of an insertion hole into which a rotary shaft is inserted, so long as the same is capable of rotatably supporting the second side of the rotary portion 200 (refer to FIG. 12).

A shaft support portion 240 may be located between the rotary shaft 440 and the shaft-coupling portion 231 so as to be coupled thereto. This shaft support portion 240 serves to support the rotary shaft 440 and the shaft-coupling portion 231 so that the rotary shaft 440 and the shaft-coupling portion 231 are rotatably coupled to each other and are capable of smoothly rotating relative to each other. The shaft support portion 240 may include, for example, a bearing 241.

In addition, the shaft support portion 240 may further include a shock-absorbing member 242, which is located between the bearing 241 and the shaft-coupling portion 231.

The shaft support portion 240, which includes the bearing 241 and the shock-absorbing member 242, may help the rotary shaft 440 and the shaft-coupling portion 231 rotate smoothly without vibrating.

Figure 4:
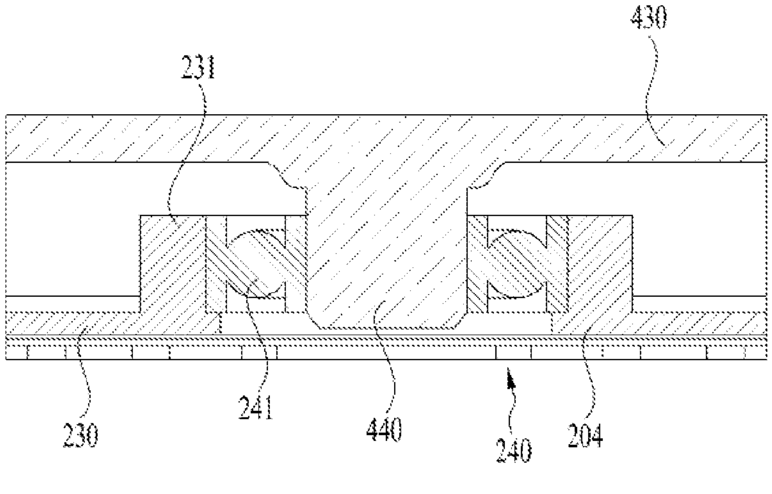
FIG. 4 is an enlarged view showing another example of portion B in FIG. 2.

FIG. 4 is an enlarged view showing another example of portion B in FIG. 2. As shown in FIG. 4, the shaft support portion 240 may include only a bearing 241. That is, the bearing 241 may be mounted between the shaft-coupling portion 231 and the rotary shaft 440 so as to be in contact therewith.

In this way, the panels 310 and 320 of the light source module 300 may be mounted between the first side (the upper frame 202) of the rotary portion 200 and the second side (the cover frame 230) of the rotary portion 200 in the longitudinal direction thereof. In this case, the first side may be coupled to the driving shaft 111 of the motor 110, and the second side may be coupled to the rotation coupling portion (the rotary shaft) 440. Accordingly, the rotary portion 200 is capable of smoothly rotating, with the two opposite sides thereof supported.

Meanwhile, referring to FIGS. 1 and 2, there may be provided a casing 400, which is located outside the fixed portion 100, the rotary portion 200, and the light source module 300.

In this case, the casing 400 may include an opaque portion 410, which is located outside the fixed portion 100, a transparent portion 420, which is located outside the light source module 300, and a cover portion 430, which is located on the transparent portion 420 to cover the upper surface thereof.

In this configuration, the rotation coupling portion 440 may be connected to the casing 400. More specifically, the rotation coupling portion 440 may be connected to the cover portion 430 of the casing 400.

That is, the rotation coupling portion 440 may be located at the center of the cover portion 430. The rotation coupling portion 440 may be integrally formed with the cover portion 430. The rotation coupling portion 440 may stably support one side of the light source module 300 via the casing 440.

Meanwhile, the fixed portion 100 and the rotary portion 200 may transfer power therebetween in a wireless power transfer manner. To this end, a transmission coil 130 for transferring wireless power may be mounted to an upper portion of the fixed portion 100, and a reception coil 220 may be mounted to a lower portion of the rotary portion 200 so as to be located at a position facing the transmission coil 130.

Figure 5:
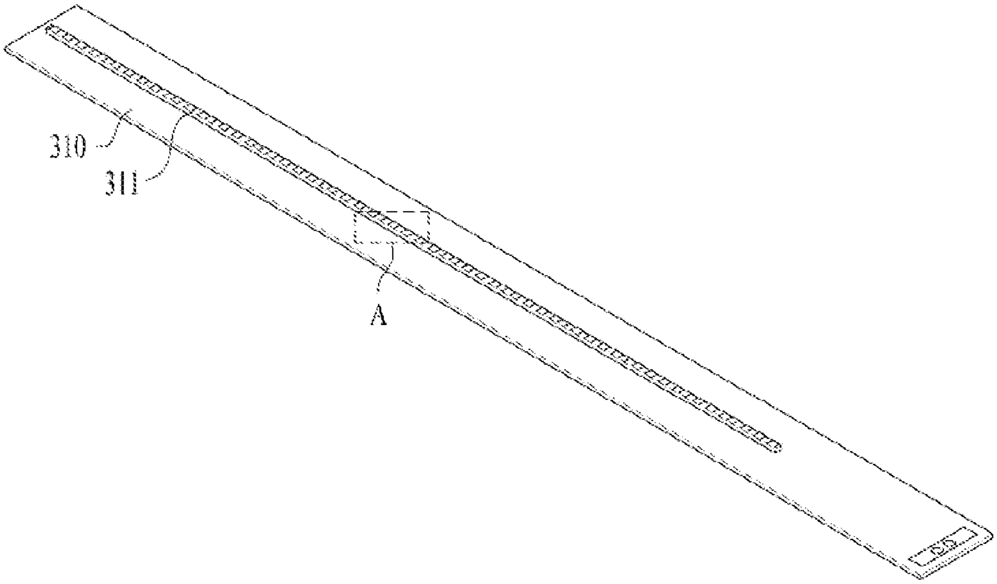
FIG. 5 is a perspective view showing the front surface of a light source module according to the present disclosure.
Figure 6:
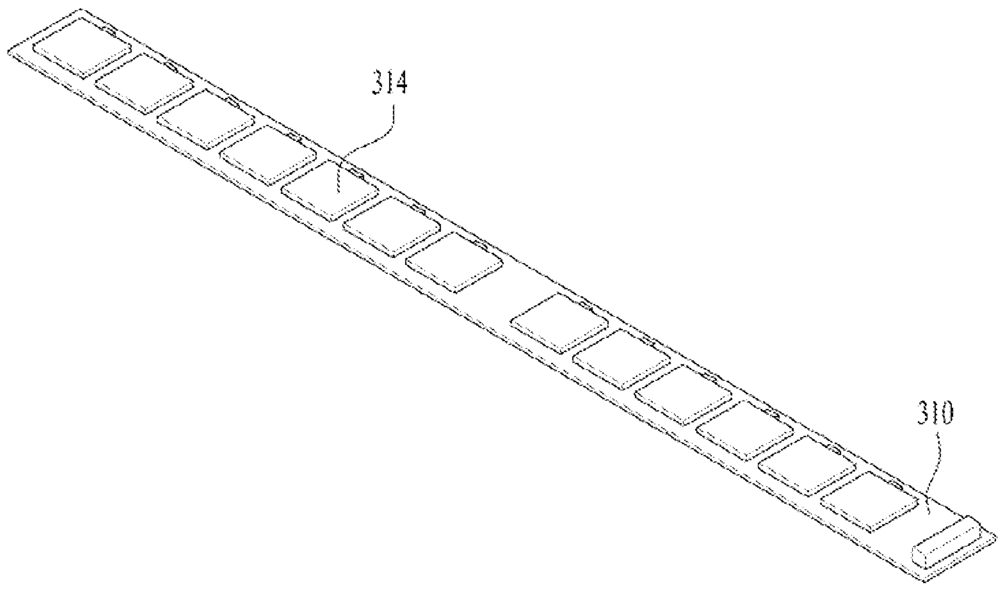
FIG. 6 is a perspective view showing the rear surface of the light source module according to the present disclosure.

FIG. 5 is a perspective view showing the front surface of the light source module according to the present disclosure, and FIG. 6 is a perspective view showing the rear surface of the light source module according to the present disclosure.

Although FIGS. 5 and 6 illustrate the first panel 310 of the first embodiment as an example, the configuration illustrated in FIGS. 5 and 6 may be identically applied not only to the other panel 320 but also to the panels 310 and 320 of the second embodiment, which will be described later. That is, the light source module of the first embodiment and the light source module of the second embodiment may have the same configuration.

FIG. 5 illustrates one panel 310 forming the light source module 300. As mentioned above, the panel 310 may be a printed circuit board (PCB). A plurality of light-emitting elements 312 (refer to FIG. 7) may be mounted on the panel 310 so as to be disposed in one direction to form pixels, thereby constituting the light-emitting element array 311. Here, a light-emitting diode (LED) may be used as the light-emitting element.

That is, the light-emitting elements 312 are disposed in one direction on one panel 310 to form individual pixels, with the result that the light-emitting element array 311 may be provided so as to be linearly mounted.

FIG. 6 illustrates the rear surface of the panel 310. Drivers 314 for driving the light-emitting elements 312 may be mounted on the rear surface of the panel 310, which constitutes the light source module.

Since the drivers 314 are mounted on the rear surface of the panel 310, as described above, the drivers 314 may not interfere with a light-emitting surface, the influence on light emission from the light sources (the light-emitting elements) 312 due to interference may be minimized, and the area of the panel 310 may be minimized. The panel 310, having a small area, may improve the transparency of the display.

Meanwhile, the front surface of the panel 310, on which the light-emitting element array 311 is mounted, may be processed into a dark color (e.g. black) in order to improve the contrast ratio and the color expression of the display, thereby maximizing the effect of the light sources.

Figure 7:
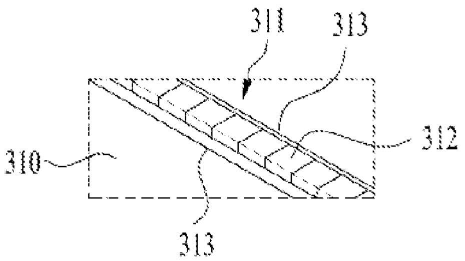
FIG. 7 is an enlarged view of portion A in FIG. 5.
Figure 8:
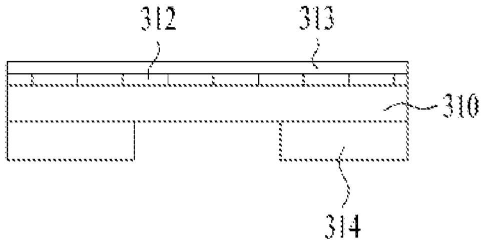
FIG. 8 is a cross-sectional view of the light source module according to the present disclosure.

FIG. 7 is an enlarged view of portion A in FIG. 5, and FIG. 8 is a cross-sectional view of the light source module according to the present disclosure.

Referring to FIG. 7, it can be seen that the individual light-emitting elements 312 are mounted linearly in one direction (the longitudinal direction of the panel). In this case, a protective portion 313 may be located outside the light-emitting elements 312 in order to protect the light-emitting elements 312.

Red, green, and blue light-emitting elements 312 may form one pixel in order to realize natural colors, and the individual pixels may be mounted in one direction on the panel 310.

Referring to FIG. 8, the light-emitting elements 312 may be protected by the protective portion 313. Further, as described above, the drivers 314 may be mounted on the rear surface of the panel 310, and may drive the light-emitting elements 312 in units of pixels or subpixels. In this case, one driver 314 may individually drive at least one pixel.

Figure 9:
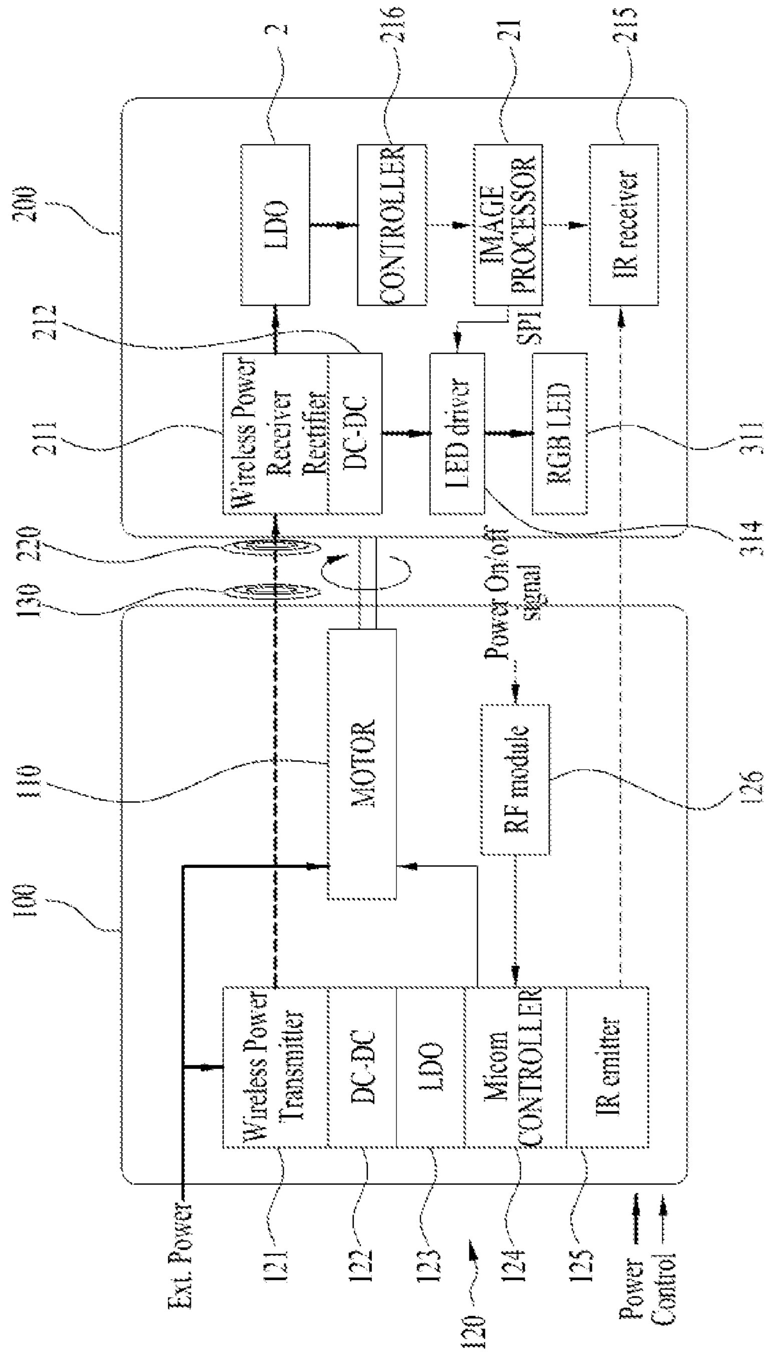
FIG. 9 is a block diagram of the rotatable display device according to the present disclosure.

FIG. 9 is a block diagram of the rotatable display device according to the present disclosure.

Hereinafter, a configuration for driving the rotatable display device will be described briefly with reference to FIG. 9. Although this configuration will be described with reference to the first embodiment described above, the same may also be identically applied to the second embodiment.

First, a driving circuit 210 may be mounted to the fixed portion 100. The driving circuit 120 may include a power supply. The driving circuit 120 may include a wireless power transmitter 121, a DC-DC converter 122, and a voltage generator 123 for supplying individual voltages.

External power may be supplied to the driving circuit 120 and the motor 110.

In addition, an RF module 126 may be provided at the fixed portion 100, so that the display may be driven in response to a signal transmitted from the outside.

Meanwhile, a means for sensing rotation of the rotary portion 200 may be provided at the fixed portion 100. Infrared radiation may be used to sense rotation. Accordingly, an IR emitter 125 may be mounted to the fixed portion 100, and an IR receiver 215 may be mounted to the rotary portion 200 at a position corresponding to the IR emitter 125.

In addition, a controller 124 may be provided at the fixed portion 100 in order to control the driving circuit 120, the motor 110, the IR emitter 125, and the RF module 126.

Meanwhile, the rotary portion 200 may include a wireless power receiver 211 for receiving a signal from the wireless power transmitter 121, a DC-DC converter 212, and a voltage generator (LDO) 213 for supplying individual voltages.

The rotary portion 200 may be provided with an image processor 216 in order to realize an image through the light-emitting element array using RGB data of an image to be displayed. The signal processed by the image processor 216 may be transmitted to the drivers 314 of the light source module, and thus an image may be realized.

In addition, a controller 214 may be mounted to the rotary portion 200 in order to control the wireless power receiver 211, the DC-DC converter 212, the voltage generator (LDO) 213, the IR receiver 215, and the image processor 216.

The image processor 216 may generate a signal for controlling light emission from the light sources of the light source module based on data of an image to be output. At this time, the data for light emission from the light source module may be internal data or external data.

The data stored in the internal device (the rotary portion 200) may be image data pre-stored in a storage device, such as a memory (an SD-card) mounted together with the image processor 216. The image processor 216 may generate a light emission control signal based on the internal data.

The image processor 216 may transmit control signals to the drivers 314 so that light-emitting element arrays 311 and 321 display image data of a specific frame in a delayed manner.

Further, the image processor 216 may transmit control signals to the drivers 314 so that the light-emitting element arrays 311 and 321 are sequentially driven.

Meanwhile, the image processor 216 may receive image data from the fixed portion 100. At this time, external data may be output through an optical data transmission device, such as a photo coupler, or an RF-type data transmission device, such as a Bluetooth or Wi-Fi device.

In this case, as mentioned above, a means for sensing rotation of the rotary portion 200 may be provided. That is, the IR emitter 125 and the IR receiver 215 may be provided as a means for detecting the rotational position (speed) of the rotary portion 200, such as an absolute rotational position or a relative rotational position, in order to output light source data suitable for each rotational position (speed) during rotation of the rotary portion 200. Alternatively, this function may also be achieved using an encoder, a resolver, or a Hall sensor.

Meanwhile, data required to drive the display may be transmitted as a signal in an optical manner at low cost using the principle of a photo coupler. That is, if the fixed portion 100 and the rotary portion 200 are provided with a light emitter and a light receiver, reception of data is continuously possible even when the rotary portion 200 rotates. Here, the IR emitter 125 and the IR receiver 215 described above may be used to transmit data.

As described above, power may be transferred between the fixed portion 100 and the rotary portion 200 in a wireless power transfer (WPT) manner.

Wireless power transfer enables the supply of power without connection of a wire using a resonance phenomenon of a coil.

To this end, the wireless power transmitter 121 may convert power into an RF signal of a specific frequency, and a magnetic field generated by current flowing through the transmission coil 130 may generate an induced current in the reception coil 220.

At this time, the natural frequency of the coil and the transmission frequency for transferring actual energy may differ from each other (a magnetic induction method).

Meanwhile, the resonant frequencies of the transmission coil 130 and the reception coil 220 may be the same (a magnetic resonance method).

The wireless power receiver 211 may convert the RF signal input from the reception coil 220 into direct current, and may transmit required power to a load.

Figure 10:
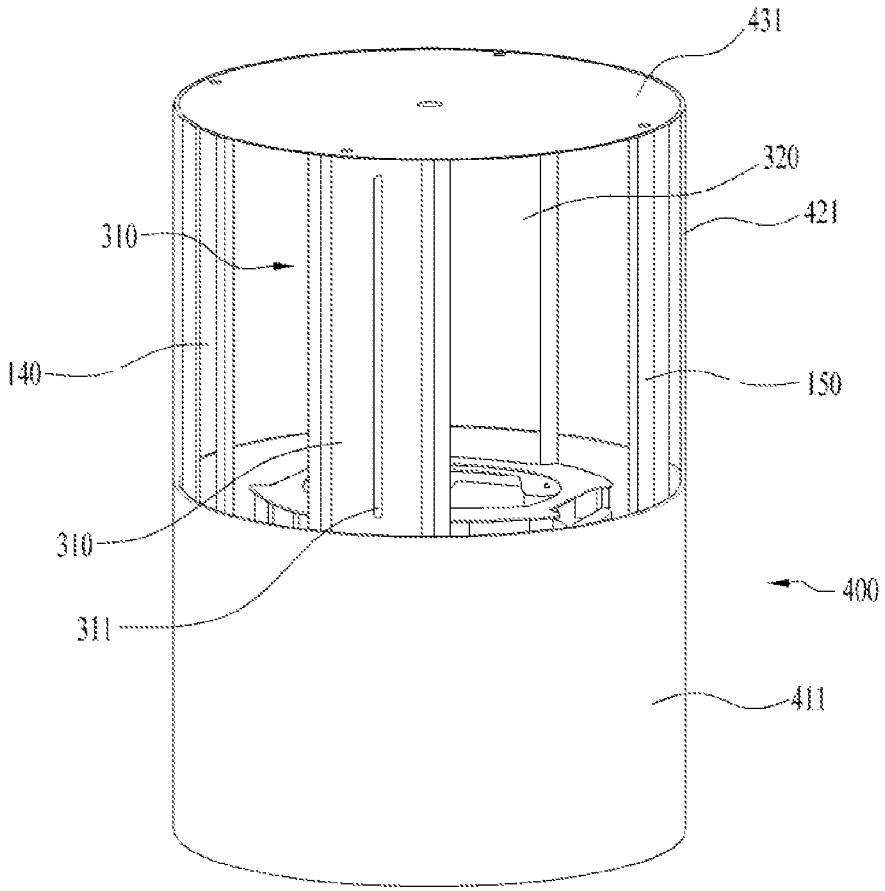
FIG. 10 is an external perspective view of a rotatable display device according to a second embodiment of the present disclosure.
Figure 11:
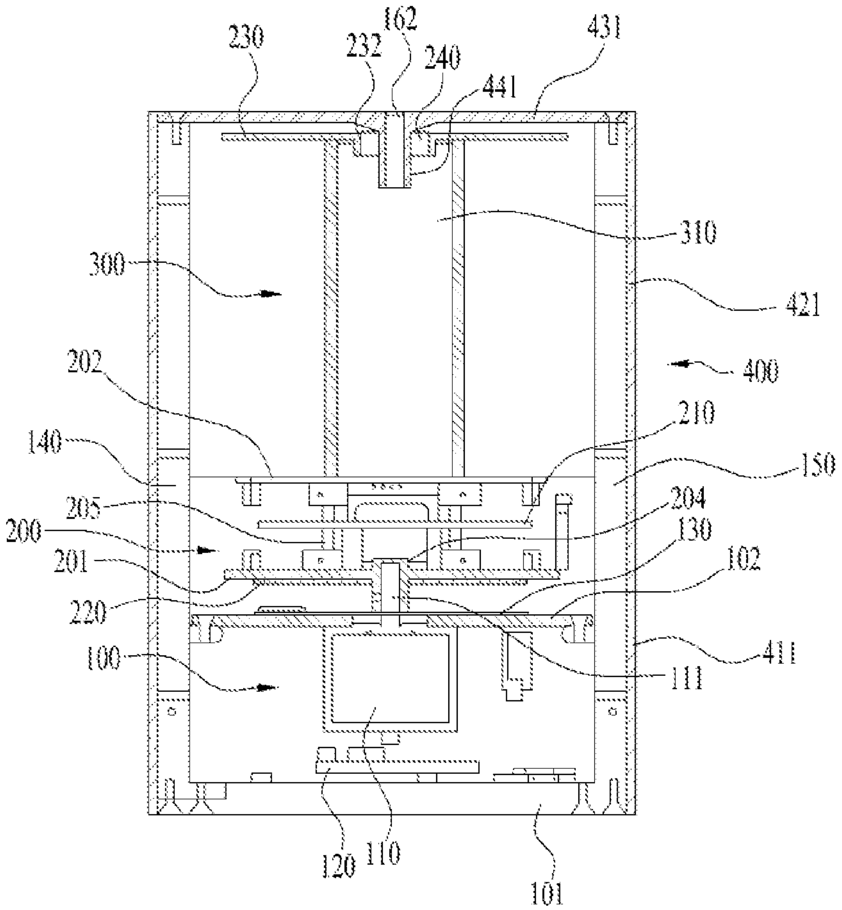
FIG. 11 is a cross-sectional view of the rotatable display device according to the second embodiment of the present disclosure.

FIG. 10 is an external perspective view of a rotatable display device according to a second embodiment of the present disclosure. In addition, FIG. 11 is a cross-sectional view of the rotatable display device according to the second embodiment of the present disclosure.

FIG. 10 illustrates a cylindrical-shaped rotatable display device in which light-emitting element arrays 311 and 321 (refer to FIG. 3) are respectively provided on one or more panels 310 and 320, which are disposed along an imaginary cylindrical outer circumferential surface, in the longitudinal direction of each of the panels.

Such a rotatable display device may broadly include a fixed portion 100, which includes a motor 110, a rotary portion 200, which is located on the fixed portion 100 and is rotated by the motor 110, and a light source module 300, which is coupled to the rotary portion 200 and includes the light-emitting element arrays 311 mounted on the panels 310 and 320 so as to implement a display by creating an afterimage resulting from rotation.

There may be provided a casing 400, which is located outside the fixed portion 100, the rotary portion 200, and the light source module 300.

In this case, the casing 400 may include an opaque portion 411, which is located outside the fixed portion 100, a transparent portion 421, which is located outside the light source module 300, and a cover portion 431, which is located on the transparent portion 421 to cover the upper surface thereof.

Hereinafter, the second embodiment of the present disclosure will be described in detail. The following description of the second embodiment will focus on differences from the first embodiment. Thus, with regard to any aspect of the second embodiment that is not described herein, reference may be made to the description of the configuration of the first embodiment.

Referring to FIGS. 10 and 11, the light source module 300 may include the light-emitting element arrays 311 and 321, which are mounted on one or more bar-shaped panels 310 and 320, which are arranged at regular intervals on the outer circumferential surface of the cylinder, in the longitudinal direction of each of the panels.

In the light-emitting element arrays 311, individual pixels may be disposed on the panels 310 and 320 in the longitudinal direction. A detailed description of the operation of the light-emitting element arrays 311 and 321 provided in the light source module 300 will be omitted.

Meanwhile, the fixed portion 100 may include frame structures 101, 102, and 103. That is, the fixed portion 100 may include a lower frame 101, an upper frame 102, and a connection frame 103, which connects the lower frame 101 and the upper frame 102 to each other.

These frame structures 101, 102, and 103 may provide a space in which to mount the motor 110, and may further provide a space in which to mount a power supply 120 and an RF module 126.

Similarly, the rotary portion 200 may include frame structures 201, 202, and 203. That is, the rotary portion 200 may include a lower frame 201, an upper frame 202, and a connection frame 203, which connects the lower frame 201 and the upper frame 202 to each other.

These frame structures 201, 202, and 203 may provide a space in which a driving circuit 210 for driving the light-emitting element arrays 311 and 321 in order to implement a display is mounted.

In this case, a driving shaft 111 of the motor 110 may be coupled to a first side of the rotary portion 200. Here, the first side of the rotary portion 200 may be the lower frame 201, which is located at a lower side of the rotary portion 200. The following description will be made with reference to the case in which the lower side (the first side) of the rotary portion 200, which is coupled to the motor 110, is the lower frame 201. However, the present disclosure is not limited thereto.

More specifically, the driving shaft 111 of the motor 110 may be fixed to a shaft-fixing portion 204 formed at the lower frame 201. In this way, the driving shaft of the motor 110 and the center of rotation of the rotary portion 200 may be coaxially located. Accordingly, the lower side of the rotary portion 200 may be coupled to the driving shaft 111 of the motor 110.

Referring to FIG. 11, a second side (that is, an upper side) of the rotary portion 200, which is opposite the first side thereof, may be rotatably coupled to a rotation coupling portion 441. That is, the rotary portion 200 is capable of rotating because the first side thereof is coupled to the motor 110 and the second side, which is opposite the first side, is rotatably coupled to the rotation coupling portion 441.

In this case, the rotation coupling portion 441 may be connected to the fixed portion 100. More specifically, the rotation coupling portion 441 may be coupled to vertical frames 140 and 150, which are connected to the fixed portion 100. The rotation coupling portion 441 may have a hole 162 formed therein. The hole 162 may function to reduce weight and to improve assemblability.

In addition, as described above, the fixed portion 100 may include frame structures 101, 102, and 103, and the vertical frames 140 and 150 may be coupled to the frame structures 101, 102, and 103.

That is, referring to FIG. 11, the vertical frames 140 and 150 may be connected to end portions of the lower frame 101 and the upper frame 102.

In this way, the rotation coupling portion 441 may be formed in the shape of a rotary shaft that extends inwards from the cover portion 431. The cover portion 431 may be connected to the fixed portion 100 via the vertical frames 140 and 150.

In this case, the rotation coupling portion 441 may be located at the center of the cover portion 431. The rotation coupling portion 441 may be integrally formed with the cover portion 431. The rotation coupling portion 441 may stably support one side of the light source module 300 via the vertical frames 140 and 150.

In this way, since both the upper side and the lower side of the rotary portion 200 are supported, the rotary portion 200 may stably rotate without positional deviation of the center of rotation thereof.

The light source module 300 may be fixedly mounted to an upper side of the upper frame 202 of the rotary portion 200.

A cover frame 230, which corresponds to the second side of the rotary portion 200, may be located on the panels 310 and 320 constituting the light source module 300.

The cover frame 230 may be provided with a shaft-coupling portion 232, which has an insertion hole formed therein to allow the rotation coupling portion 441 to be fitted thereinto.

In this case, the rotation coupling portion 441 may include a rotary shaft 441, which is inserted into the second side of the rotary portion 200, i.e. the shaft-coupling portion 232. That is, the rotation coupling portion 441 may be formed in the shape of a rotary shaft.

Figure 12:
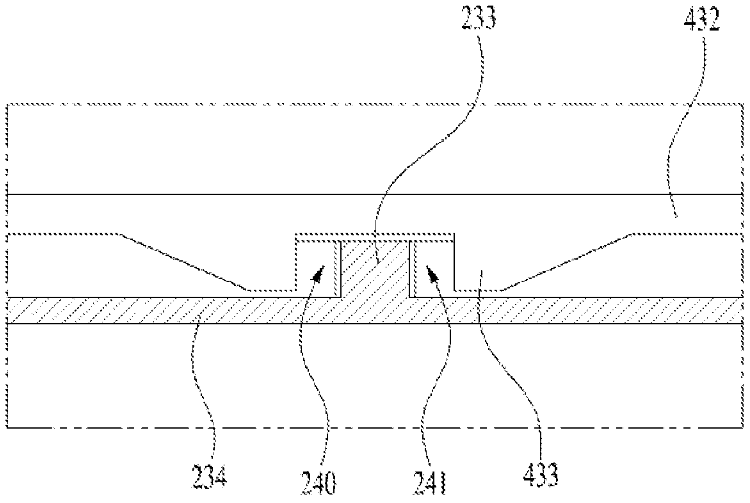
FIG. 12 is an enlarged view showing another example of coupling of a second side of a rotary portion of the rotatable display device according to the second embodiment of the present disclosure.

Alternatively, as shown in FIG. 12, the cover frame 234, which corresponds to the second side of the rotary portion 200, may be provided with a shaft portion 233, which protrudes upwards, and the cover portion 431 may have formed therein an insertion hole 433 into which the shaft portion 233 is inserted.

In this case, a shaft support portion 240 may be located between the shaft portion 233 and the insertion hole 433 so as to be coupled thereto. This shaft support portion 240 serves to support the shaft portion 233 and the insertion hole 433 so that the shaft portion 233 and the insertion hole 433 are rotatably coupled to each other and are capable of smoothly rotating relative to each other. The shaft support portion 240 may include, for example, a bearing 241.

In this case, the shaft support portion 240 may further include a shock-absorbing member (refer to FIG. 3), in addition to the bearing 241.

The shaft support portion 240, which includes the bearing 241, may help the rotary shaft 440 and the shaft-coupling portion 232 rotate smoothly without vibrating.

In this way, the panels 310 and 320 of the light source module 300 may be mounted between the first side (the upper frame 202) of the rotary portion 200 and the second side (the cover frame 230) of the rotary portion 200 in the longitudinal direction thereof. In this case, the first side may be coupled to the driving shaft 111 of the motor 110, and the second side may be coupled to the rotation coupling portion (the rotary shaft) 441. Accordingly, the rotary portion 200 is capable of smoothly rotating, with the two opposite sides thereof supported.

A general rotatable display device is structured such that a lower side of a light source module is connected to a driving shaft of a motor so as to be rotated thereby. Because the light source module is supported by a single shaft, vibration occurs due to the insufficient stiffness of a rotary shaft during rotation thereof at high speed, leading to screen shaking.

A rotatable display device is applicable to end products including image display devices, such as artificial intelligence speakers and small display apparatuses. In the case of a general product having a single-shaft support structure, when the product is dropped or when an external impact is applied thereto, the shaft may be deformed, or the product may be damaged due to the insufficient stiffness of the shaft.

Figure 13:
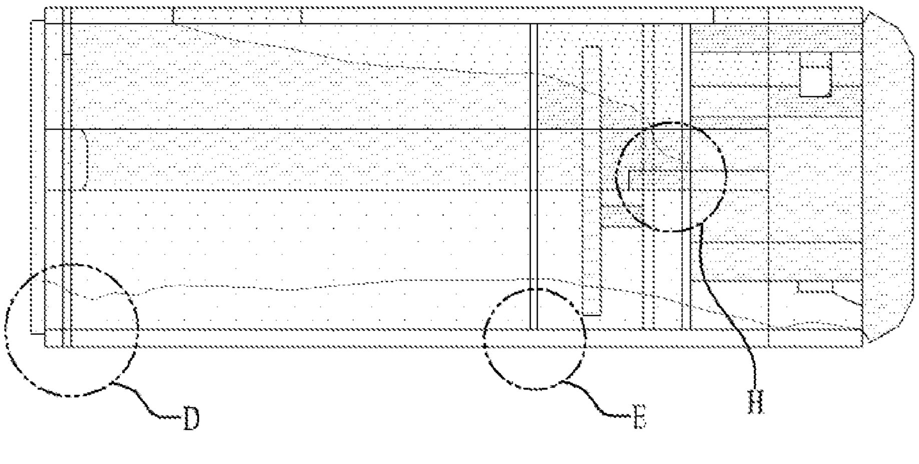
FIG. 13 is a simulation diagram showing changes in a rotatable display device having a single-shaft support structure when the same is dropped.

Because it is difficult to observe changes in the interior of a product when the product is dropped, it is necessary to analyze the same through simulation. FIG. 13 is a simulation diagram showing changes in the interior of a rotatable display device having a single-shaft support structure when the same is dropped.

It can be seen from FIG. 13 that, when a rotatable display device having a single-shaft support structure is dropped, a rotary frame and an inner frame collide with each other and stress is concentrated on a shaft of a motor.

That is, describing the same in the context of the above-described embodiment, portion D in FIG. 13, on which stress is primarily concentrated, corresponds to the cover frame 230 of the rotary portion 200, and portion E corresponds to the upper frame 202 of the rotary portion 200. In addition, portion H corresponds to the driving shaft 111 of the motor 110.

Meanwhile, a rotatable display device using an afterimage displays one image sheet for each rotation thereof. When the rotational speed thereof is low, screen flickering occurs. For example, when it is necessary to output a 60 Hz image, a rotatable display device provided with a single light source module (panel) needs to be rotated at 3600 rpm.

In order to reduce the number of rotations per minute, the number of light source modules (panels) may be increased. However, increasing the number of light source modules decreases transparency (see-through) and increases costs. Therefore, it is necessary to select an appropriate number of light source modules and an appropriate rotational speed thereof.

In the case of a motor-powered rotatable device, the operational speed thereof is selected so as to avoid a critical speed in order to reduce vibration and noise and to increase the lifespan of the device. In general, the operational speed is designed to be outside of a range of the critical speed ±25%.

Here, the critical speed may be measured on the basis of a natural frequency of a system, or may be calculated based on a simulation such as finite element analysis. In a rotary body, a natural frequency is an eigenvalue determined by the moment of inertia and the stiffness of a structure, and may be increased using a lightweight and high-stiffness material.

However, the present disclosure is capable of solving the above-described problems without needing to change materials. This will be described below in detail.

As a result of analyzing vibration simulation for a rotatable display device that is composed of a light source module including the two panels of the present disclosure and has a single-shaft support structure (that is, a structure in which only a driving shaft of a motor is connected to a rotary portion), it can be seen that a primary natural frequency is 30 Hz, and at this time, the rotatable display device performs rotating movement in a tilted state.

That is, when the rotational speed is about 1800 rpm, the light source module is rotated in a tilted state by exciting force, such as eccentricity, and at this time, vibration, noise, and image shaking occur, which may significantly degrade the quality of the product.

Therefore, there is a need for a structure having a high natural frequency with respect to the required number of rotations per minute. It may be possible to increase the stiffness of a shaft system and thus to increase the natural frequency by employing the above-described double-ended support structure in which the rotary portion 200 is rotated, with both the first side and the second side thereof supported.

Figure 14:
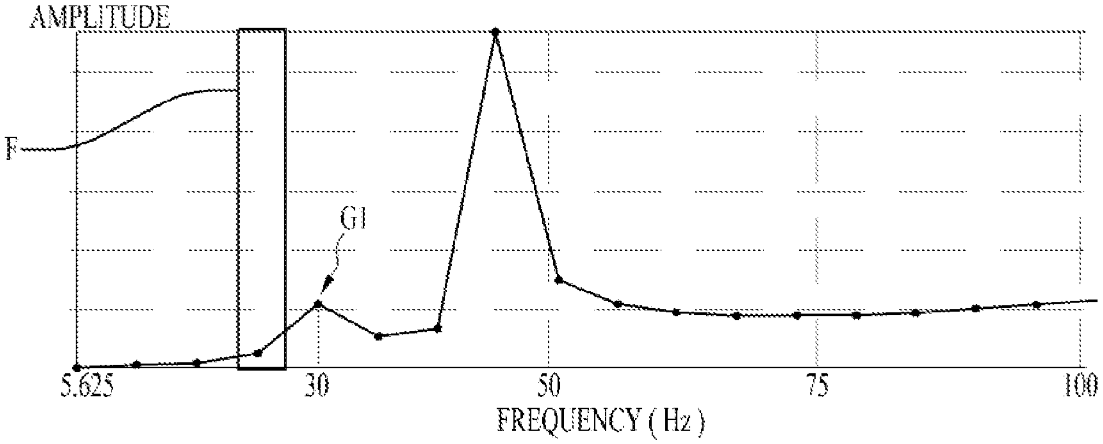
FIG. 14 is a graph showing the frequency response characteristics of a general rotatable display device having a single-shaft support structure.
Figure 15:
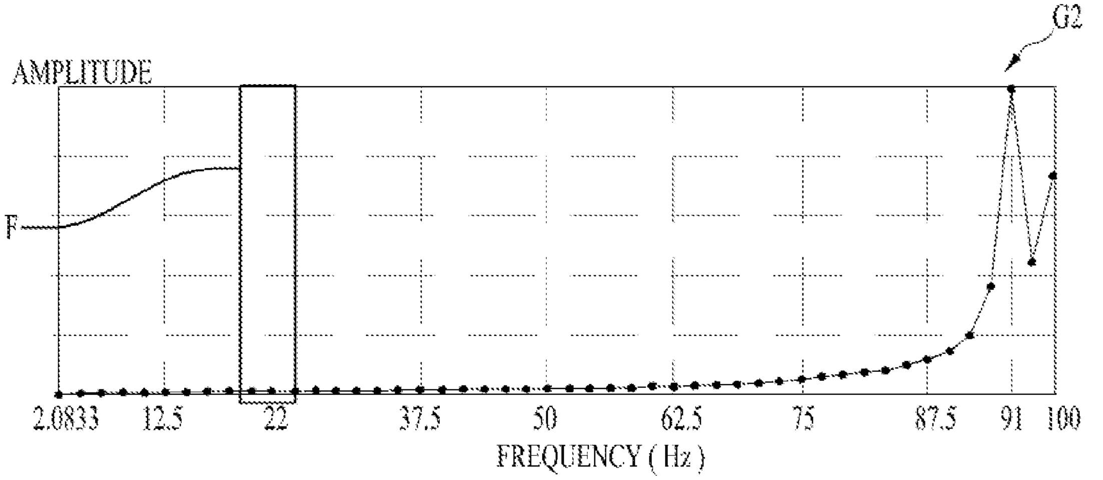
FIG. 15 is a graph showing the frequency response characteristics of the rotatable display device according to the embodiment of the present disclosure.

FIG. 14 is a graph showing the frequency response characteristics of a general rotatable display device having a single-shaft support structure. In addition, FIG. 15 is a graph showing the frequency response characteristics of the rotatable display device according to the embodiment of the present disclosure.

Referring to FIG. 14, it can be seen that the rotatable display device having a single-shaft support structure has a primary natural frequency of 30 Hz (G1). In addition, a secondary natural frequency thereof is about 45 Hz.

When a 60 Hz image is realized using the light source module including two panels 310 and 320 (3600 Hz), the rotational frequency is 30 Hz. In addition, when a 45 Hz image is realized (2700 rpm), the rotational frequency is 22.5 Hz.

Accordingly, in the case of a rotatable display device having a single-shaft support structure, the primary natural frequency overlaps or is similar to the rotational frequency band of the rotatable display device, and accordingly, vibration and noise may be increased due to a resonance phenomenon. As a result, the quality of the product may be significantly deteriorated due to the occurrence of image shaking.

Meanwhile, referring to FIG. 15, it can be seen that the rotatable display device according to the embodiment of the present disclosure has a primary natural frequency of 91 Hz (G2). In addition, although not shown in FIG. 15, a secondary natural frequency thereof is about 110 Hz.

That is, it can be confirmed that, when the configuration of the rotatable display device is changed from the single-shaft support structure to the double-ended support structure of the present disclosure, the natural frequency can be increased twofold or greater, i.e. to 60 Hz or greater.

Accordingly, since the primary natural frequency is distant from the rotational frequency band of the rotatable display device, vibration and noise may be greatly reduced.

Therefore, it may be possible to enable the rotary portion to rotate at an appropriate speed by stably supporting the rotation of the rotary portion without a change, for example, without using a lightweight and high-stiffness material, thereby preventing the occurrence of vibration and noise of the light source module and an image shaking phenomenon.

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe the same, and the scope of the technical idea of the present disclosure is not limited by such embodiments.

The scope of protection of the present disclosure should be interpreted by the claims below, and all technical ideas within the scope equivalent thereto should be construed as being included in the scope of the present disclosure.

INDUSTRIAL APPLICABILITY

The present disclosure may provide a rotatable display device using a light-emitting diode (LED), which is a semiconductor light-emitting element.

What is claimed is:

1. A rotatable display device comprising:

a fixed portion comprising a motor;

a rotary portion located on the fixed portion and comprising a first side coupled to the motor and a second side rotatably coupled to a rotation coupling portion, the second side being opposite the first side, wherein the rotation coupling portion comprises a rotary shaft inserted into the second side of the rotary portion which comprises a shaft-coupling portion into which the rotary shaft is inserted; and a light source module mounted to the rotary portion and comprising:

one or more panels disposed at respective positions on a rotational circumference of the rotary portion; and light-emitting element arrays comprising individual pixels disposed along a longitudinal length of the one or more panels.

2. The rotatable display device of claim 1, further comprising a casing which encases the fixed portion, the rotary portion, and the light source module.

3. The rotatable display device of claim 2, wherein the rotation coupling portion is connected to the casing.

4. The rotatable display device of claim 2, wherein the casing comprises:

an opaque portion positioned to correspond to the fixed portion;

a transparent portion positioned to correspond to the light source module; and a cover portion located above the transparent portion.

5. The rotatable display device of claim 4, wherein the rotation coupling portion is positioned to correspond to a center of the cover portion.

6. The rotatable display device of claim 4, further comprising a shaft support portion located between the rotary shaft and the shaft-coupling portion so as to facilitate coupling and rotation between the rotary shaft and the shaft-coupling portion.

7. The rotatable display device of claim 1, wherein the longitudinal length of the one or more panels of the light source module extend between the first side and the second side of the rotary portion.

8. The rotatable display device of claim 1, wherein the rotation coupling portion is connected to the fixed portion.

9. The rotatable display device of claim 8, wherein the rotation coupling portion is coupled to a vertical frame connected to the fixed portion.

10. The rotatable display device of claim 9, wherein the fixed portion comprises a frame structure, and the vertical frame is coupled to the frame structure.

* * * * *